(12) United States Patent
Malvern (10) Patent No.: US 9,201,091 B2
(45) Date of Patent: Dec. 1, 2015

(54) ACCELEROMETER CONTROL SYSTEMS

(75) Inventor: Alan Malvern, Plymouth (GB)

(73) Assignee: ATLANTIC INERTIAL SYSTEMS LIMITED (GB)

( * ) Notice: Subject to any disclaimer, the term of this patent is extended or adjusted under 35 U.S.C. 154(b) by 968 days.

(21) Appl. No.: 13/263,908

(22) PCT Filed: Apr. 14, 2010

(86) PCT No.: PCT/EP2010/054855
§ 371 (c)(1),
(2), (4) Date: Nov. 15, 2011

(87) PCT Pub. No.: WO2010/119046
PCT Pub. Date: Oct. 21, 2010

(65) Prior Publication Data
US 2012/0116707 A1 May 10, 2012

(30) Foreign Application Priority Data

Apr. 14, 2009 (GB) .................................. 0906298.5
May 14, 2009 (GB) .................................. 0908288.4

(51) Int. Cl.
*G05B 24/02* (2006.01)
*G01P 15/125* (2006.01)
(Continued)

(52) U.S. Cl.
CPC ............... *G01P 15/125* (2013.01); *G01P 21/00* (2013.01); *G05B 24/02* (2013.01); *G01P 2015/0814* (2013.01); *G06F 17/40* (2013.01); *G06F 19/00* (2013.01)

(58) Field of Classification Search
CPC ........... G01D 7/00; G01D 9/00; G01D 21/00; G01P 1/00; G01P 15/00; G01P 15/02; G01P 15/08; G01P 2015/0802; G01P 2015/0805; G01P 2015/0808; G01P 2015/0811; G01P 2015/0814; G01P 15/25; G01P 21/00; G06F 11/00; G06F 11/30; G06F 11/32; G06F 11/34; G06F 15/00; G06F 15/16; G06F 17/00; G06F 17/10; G06F 17/40; G06F 19/00; G05B 11/00; G05B 11/01; G05B 11/011; G05B 21/00; G05B 21/02; G05B 24/00; G05B 24/02; G05B 99/00
USPC ............ 73/1.01, 1.37, 1.38, 1.39, 432.1, 488, 73/514.01, 514.16, 514.32, 514.35, 73/514.36, 514.38, 865.8, 865.9, 866.3; 702/1, 33, 41, 85, 104, 124, 141, 182, 702/187, 189; 708/100, 105, 200; 700/1, 700/28, 32, 33, 90

See application file for complete search history.

(56) References Cited

U.S. PATENT DOCUMENTS 3,288,160 A * 11/1966 Eggenberger et al. .......... 137/48
6,651,499 B2 11/2003 Fell et al.
(Continued)

FOREIGN PATENT DOCUMENTS

DE  10 2005 031 607    2/2007
WO       0116606 A1    3/2001

OTHER PUBLICATIONS

Baoqing, Li et al, Open-loop operating mode of micromachined capacitive accelerometer; Sensors and Actuators, vol. 79, 2000, pp. 219-223.

(Continued)

*Primary Examiner* — Edward Cosimano
(74) *Attorney, Agent, or Firm* — Cantor Colburn LLP (57) ABSTRACT

An accelerometer open loop control system comprising a variable capacitance accelerometer having a proof mass movable between fixed capacitor plates, drive signals applied to the capacitor plates, a charge amplifier amplifying an accelerometer output signal representing applied acceleration, and an autoranging facility for monitoring the output signal, and for adjusting the drive signals in dependence on the output signal in order to restrict the amplitude of the accelerometer output signal, thus maintaining sensitivity of the accelerometer while permitting response to a wide range of g values. Corrections are applied by means of look up tables to compensate for inaccuracies arising from movement of the proof mass and temperature variations.

24 Claims, 6 Drawing Sheets

(51) Int. Cl.
 G01P 21/00 (2006.01)
 G06F 17/40 (2006.01)
 G06F 19/00 (2011.01)
 G01P 15/08 (2006.01)

(56) References Cited

U.S. PATENT DOCUMENTS

| | | | |
|---|---|---|---|
| 7,047,808 | B2 | 5/2006 | Malvern et al. |
| 7,243,545 | B2 * | 7/2007 | Sakai et al. ................ 73/514.32 |
| 7,267,006 | B2 | 9/2007 | Malvern |
| 7,642,913 | B2 * | 1/2010 | Hayakawa .................... 340/540 |
| 2004/0182157 | A1 | 9/2004 | Sakai et al. |
| 2005/0081632 | A1 * | 4/2005 | Malvern et al. ............ 73/514.12 |
| 2006/0112765 | A1 * | 6/2006 | Malvern ..................... 73/514.32 |
| 2006/0123908 | A1 | 6/2006 | Ito |
| 2008/0136627 | A1 | 6/2008 | Hayakawa |
| 2009/0095080 | A1 | 4/2009 | Sasaki |

OTHER PUBLICATIONS

International Search Report dated Aug. 12, 2010.
GB Search Report for Application No. GB0906298.5; Mailing Date May 22, 2009, 4 pages.

* cited by examiner

+/-1g Compensated Output

Uncompensated Output
showing range switching

FIG. 5

Low acceleration levels have high amplitude of PD and SD

High acceleration level has low amplitude of SD and PD outputs

FIG. 6

ACCELEROMETER CONTROL SYSTEMS

CROSS REFERENCE TO RELATED APPLICATION

The present application is the U.S. national stage application of International Application PCT/EP2010/054855, filed Apr. 14, 2010, which international application was published on Oct. 21, 2010 as International Publication WO 2010/119046. The International Application claims priority of British Patent Application 0906298.5, filed Apr. 14, 2009 and British Patent Application 0908288.4, filed May 14, 2009, the contents of which are incorporated herein by reference in their entireties.

FIELD OF THE INVENTION

The present invention relates to accelerometer control systems.

BACKGROUND ART

Figure 1:
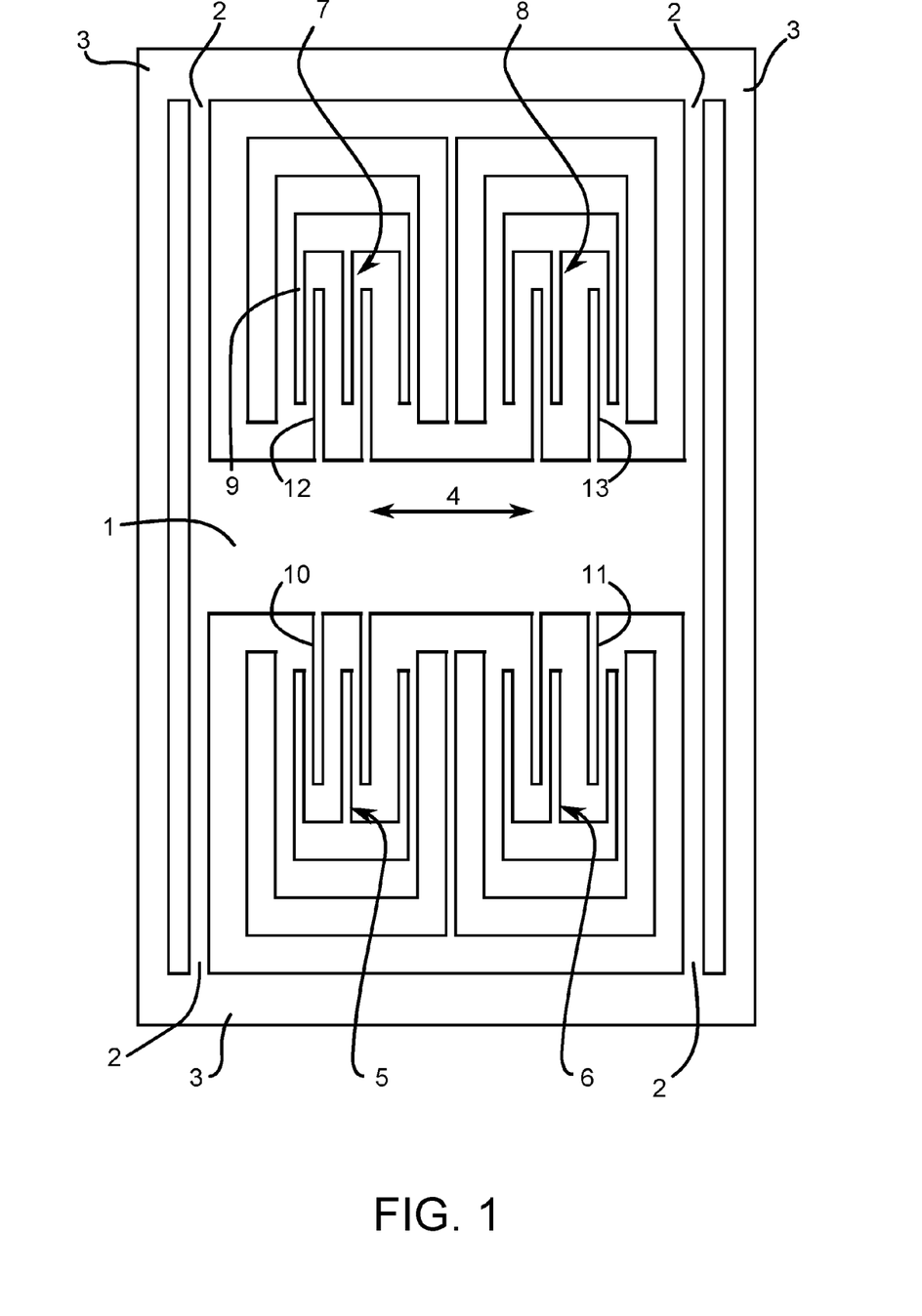
FIG. 1 is a schematic plan view of an accelerometer according to a prior art construction.

Accelerometers, which are responsive to linear acceleration, are disclosed in U.S. Pat. Nos. 7,047,808 and 7,267,006. The described accelerometers are of the variable capacitance type, comprising a proof mass movable between fixed capacitor plates. They are constructed in silicon as MEMS devices, with a proof mass on a thin suspension so as to be movable, which is sandwiched between two fixed capacitor plates each at a small gap from the proof mass. Under the effect of acceleration on the accelerometer one gap increases and the other decreases to give a differential output signal. The construction includes interdigitated fingers, which increase sensitivity and increase gain to get the noise down. This construction is shown in FIG. 1, which includes a plate-like proof mass 1, four flexible mounting legs 2 co-planar with the proof mass 1, which are mounted between the mass 1 and a ring-like support 3. The proof mass 1 is mounted for linear movement in its plane and in a sensing direction 4, in response to acceleration applied to the accelerometer. Interdigitated fingers 9 comprise fixed first, second, third and fourth arrays 5, 6, 7, 8, which interdigitate with respective arrays 10, 11, 12, 13 extending from proof mass 1. Gaps between fingers are made as small as possible, in order to increase sensitivity and provide the lowest noise possible. An output signal is taken from the proof mass, and applied to a charge amplifier. Problems which arise are firstly that only a restricted range of g values may be measured, due to saturation of the charge amplifier. Secondly, there is a problem of non-linearity in measurements, being caused by temperature variation, and also by the mechanical construction of the accelerometer, mainly the ratio of the proof mass displacement to the interdigitation gap. Such non-linearities introduce uncertainties into the measurement of acceleration.

U.S. Pat. No. 6,651,499 discloses a gyroscope, which is responsive to variable rates of rotation, and which is constructed as a planar ring vibrating structure. The gyroscope is coupled to a closed loop control system, which maintains control over primary drive and secondary drive, and maintains a pick off at a null value. The minimum detectable rotation rate that can be resolved is determined by electronic noise in a pick off amplifier. In order to maintain sensitivity whilst having the capability of measuring a wide range of rotation rates, a scale factor variation is introduced within closed control loops. This is effective to dynamically scale the output signal in proportion to the reducing amplitude of motion as the input angular rate increases thereby giving a broader input rate range.

SUMMARY OF THE INVENTION

It is an object of the invention to provide a control system for an accelerometer of the variable capacitance type, which will permit the accelerometer to be responsive to a wide range of accelerations whilst maintaining sensitivity.

It is a further object of the invention to provide a control system for an accelerometer of the variable capacitance type, wherein inaccuracies arising from the construction of the accelerometer and/or temperature changes are reduced.

The concept of the invention is to provide a control system for an accelerometer of the variable capacitance type, having a proof mass movable between fixed capacitor plates, wherein the control system has an open loop configuration and is responsive to an output signal from the accelerometer representing acceleration. An open loop control system is preferred for simplicity of implementation, as compared for example to a closed loop control system, which inter alia requires maintaining the proof mass at a null position.

Commonly the accelerometer output signal is amplified by a charge amplifier, and, in order to reduce noise and maintain sensitivity as far as possible, a monitoring function is employed. This is because noise reduction generally implies a high drive level voltage applied to the fixed capacitor plates to increase signal to noise ratio, but this further implies that the charge amplifier will reach a saturation condition relatively quickly under increasing applied g. Accordingly the accelerometer output signal is monitored and dynamically assessed, as will be described, and a drive signal (usually a high frequency signal) applied to the accelerometer is reduced in amplitude in an appropriate manner as the accelerometer output signal increases. This technique is commonly known as autoranging, and for the purposes of the specification, autoranging is intended to mean an automatic adjustment of drive levels applied to the accelerometer, to restrict the amplitude of the accelerometer output signal. Thus auto ranging, by reducing the drive level as the g increases, allows a large dynamic range of the sensor coupled with low noise, which is particularly important at low g. A large drive level is used at low g, which has the effect of giving a bigger signal, with a consequential lower noise. By the use of auto ranging a large g range can be used together with a reasonable noise. This can either be done continually, or with a discrete set of drive levels. In a preferred embodiment, two separate drive levels are employed, one at high voltage level (2.5 V) for low values of g, up to about 7 g, and a low level drive at one quarter of the high level for higher values of g.

Accordingly, in a first aspect, the invention provides an accelerometer open loop control system comprising a variable capacitance accelerometer comprising a proof mass movable between first and second capacitor plates, drive means for applying drive signals to said capacitor plates, amplifier means for amplifying an accelerometer output signal representing applied acceleration, and monitoring means for monitoring said output signal, and for adjusting said drive signals in dependence on the output signal in order to restrict the amplitude of said accelerometer output signal.

Nevertheless, it is necessary to monitor a wide range of accelerometer output signals if the accelerometer is to respond to a wide range of acceleration values. In accordance with the invention, corrections are made dynamically to the monitored signal in order to compensate for non-linearities arising from movement of the proof mass. In addition, compensation for temperature variations, which create inaccuracies in the output signal, is desirable. As preferred, corrections are provided, based on polynomial expressions, which define the non-linearities in terms of movement of the capacitance device and temperature as a function of the accelerometer output signal. Third order polynomial expressions may be sufficient, as described below.

The correction values may be provided by real time computation, where the available processing power permits. Alternatively look up tables are provided. It may be possible, if the look up tables are sufficiently large, to access the tables by means of current values of accelerometer output and temperature, and to readout in a single operation the corrected value for accelerometer output. However, since correction for temperature is complex, it has been found desirable, in accordance with the invention, to provide a set of lookup tables for temperature correction, which provide certain Scale Factor and Bias values, and then to combine these values in an arithmetic operation with a demodulated version of the accelerometer output signal to give a corrected version, which represents acceleration. As regards correction for non-linearity arising from movement of the proof mass, this may be effected by a further look up table which corrects the temperature compensated accelerometer output, to a final output value, which can be converted directly to an output g value. In addition, such corrected version of the accelerometer output signal may be used by the autoranging function as a basis for assessing whether the drive level applied to the accelerometer requires adjustment.

Non-linearity compensation needs to be done very quickly, so the effects are effectively taken out at source. One particular concern relates to vibration rectification, where AC components of vibration, due to second order non-linearity of the sensor, can give rise to a DC response of the accelerometer. Therefore dynamic assessment needs to take place at a frequency higher than anticipated vibration. This however requires particular attention to be paid to ensuring synchronism within the open loop control system, so that compensation values, which are derived, are applied to the value of the accelerometer signal, which exists at an appropriate time instant.

Temperature compensation may be provided by a scale factor correction value, together with a DC bias value. These corrections are applied to accelerometer output signal, the DC bias value compensating for changes or offsets in the null or centre position of the proof mass at 0 g applied acceleration, arising from changes in temperature. Such bias signal may be provided by a look up table, based on a polynomial expression, which defines the bias signal required in terms of for example temperature. As an alternative to providing a DC bias level value, differential drive levels applied to the accelerometer are varied between the in phase and out of phase drives so they are not exactly equal.

In a further aspect, the present invention provides an accelerometer open loop control system comprising a variable capacitance accelerometer comprising a proof mass movable between first and second capacitor plates, drive means for applying drive signals to the fixed capacitor plates, amplifier means for amplifying an accelerometer output signal representing applied acceleration, and including means for applying a correction to compensate for inaccuracies arising from non-linearities in mechanical movement of said proof mass and/or to compensate for inaccuracies arising from changes in temperature of said accelerometer.

BRIEF DESCRIPTION OF THE DRAWINGS

A preferred embodiment of the invention will now be described with reference to the accompanying drawings wherein.

DESCRIPTION OF THE PREFERRED EMBODIMENTS

Figure 2:
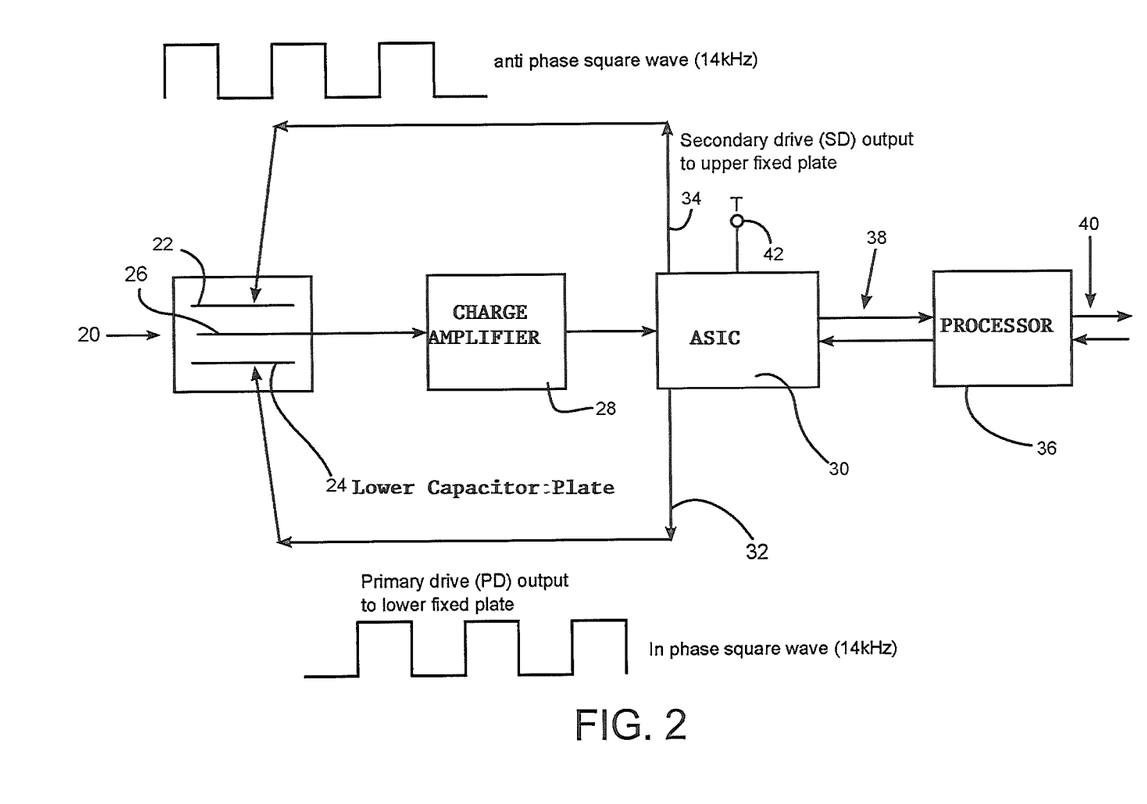
FIG. 2 is a block diagram of an accelerometer control system in accordance with a first embodiment of the invention.
Figure 6:
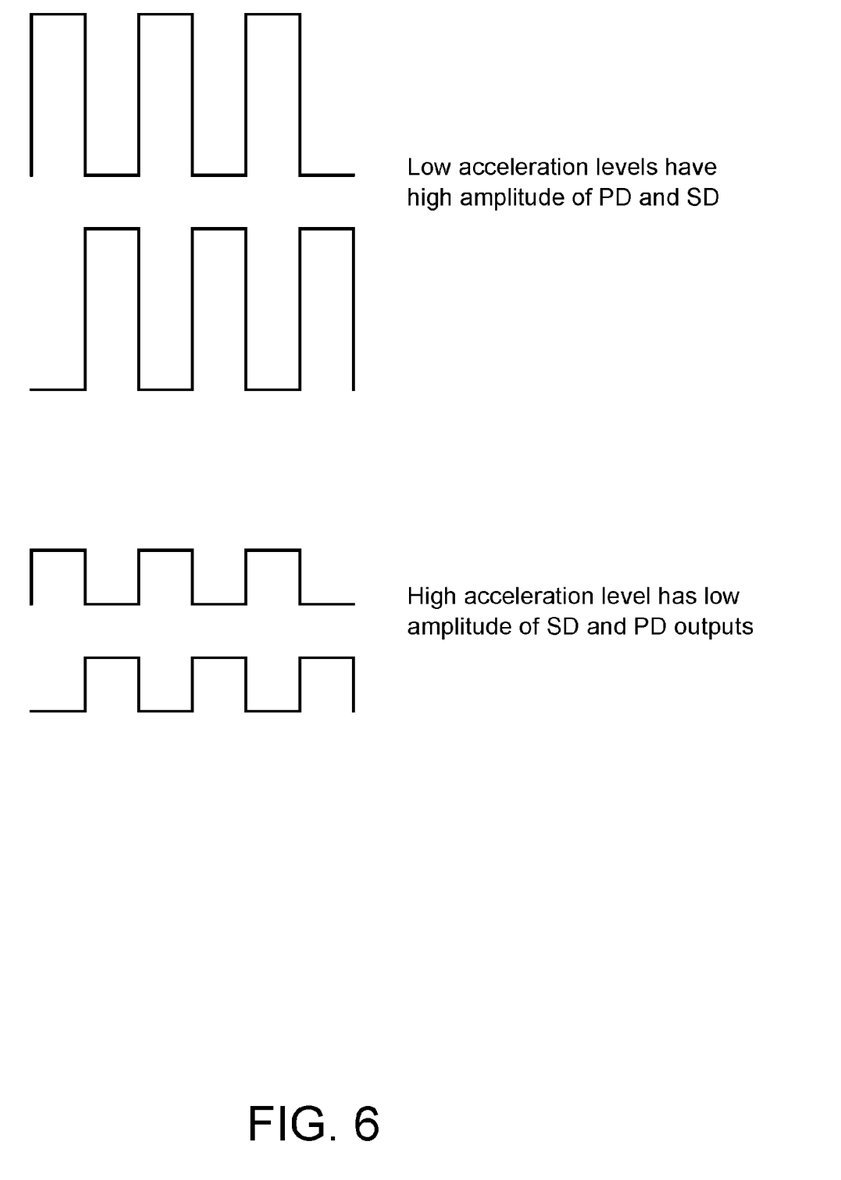
FIG. 6 is a schematic view of the drive signals applied to the accelerometer in accordance with the invention.

Referring now to FIG. 2 of the drawings, an open loop accelerometer control system is shown including autoranging and non-linearity compensation functions. An accelerometer 20 is of the variable capacitance type, and may be constructed as a MEMS device as shown in FIG. 1, with upper and lower fixed capacitor plates 22, 24 and a movable proof mass plate 26. Proof mass 26 provides an output signal, which represents acceleration as detected by the accelerometer, and this signal is coupled to a charge amplifier 28, which is physically mounted on proof mass 26 (a charge amplifier being a circuit whose equivalent input impedance is a capacitance that provides a very high value of impedance at low frequencies). Amplifier 28 is coupled to an ASIC 30. The ASIC provides primary drive (PD) and antiphase secondary drive (SD) square wave drive signals 32, 34, at 14 kHz frequency, to respective plates 24, 22. In this embodiment, there are two possible values of drive signal amplitude, 2.5 V full drive, and one quarter value, 0.6V, as shown in FIG. 6. ASIC 30 is controlled by a microprocessor 36, via an SPI (serial peripheral interface) comms bus 38. Processor 36 is arranged for communication with the outside world with data bus 40. A temperature sensor 42 is integrated with ASIC 30 for providing temperature information.

Figure 3:
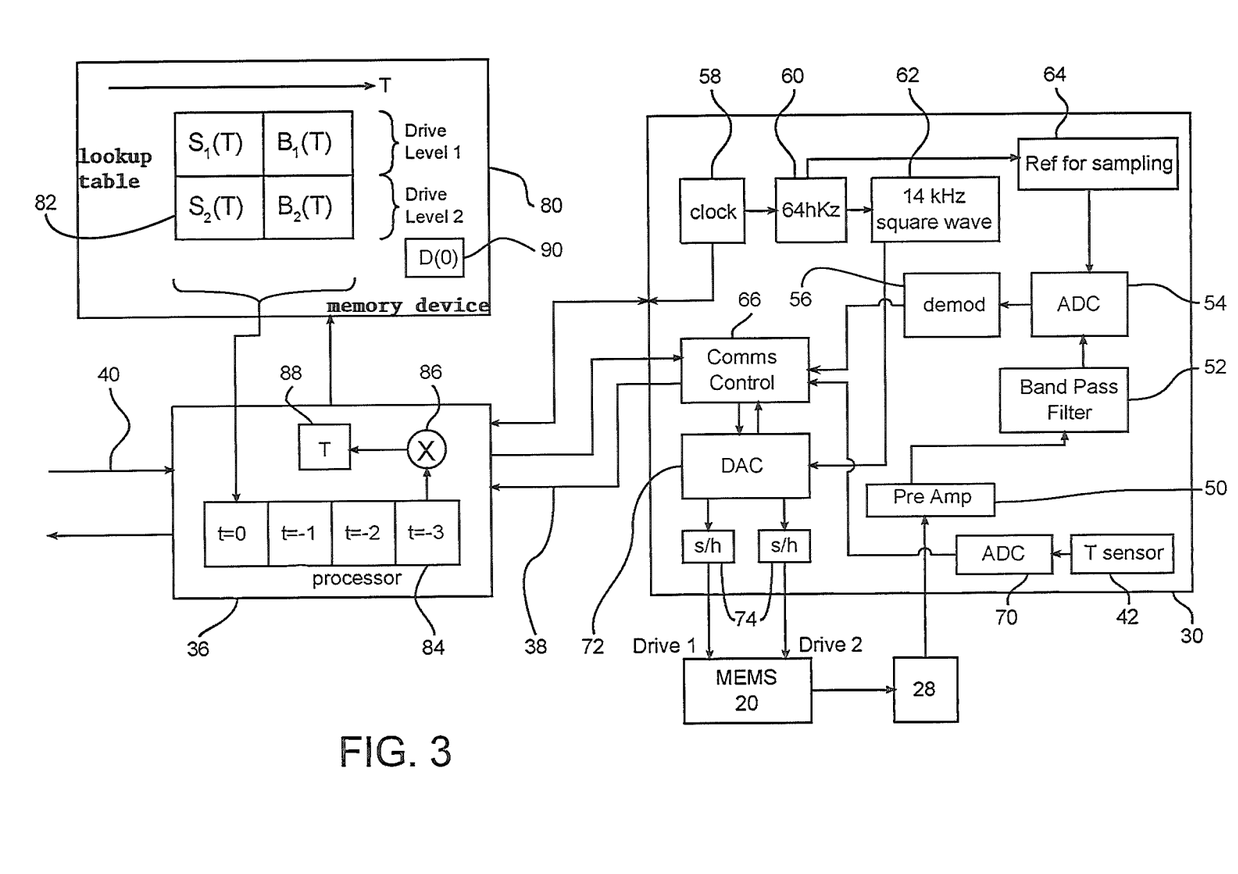
FIG. 3 is a more detailed block diagram of a control ASIC and microprocessor of FIG. 2.

As shown in more detail in FIG. 3, ASIC 30 includes a processing chain coupled to the output of the Charge amplifier 28, comprising preamp 50, bandpass filter 52, ADC 54, and signal demodulator 56. A clock 58 is divided by a 64 KHz sampling signal unit 60 and a 14 KHz square drive wave signal unit 62 for the accelerometer drive signal. A sampling reference unit 64 coupled to unit 60 and ADC 54 provides four ADC sampling instants per 14 kHz drive cycle. The ADC 54 output, passed to demodulator 56, provides a digitised and demodulated version of the charge amplifier output to Comms Control 66, which is coupled via bus 38 to processor 36. A signal from temperature sensor 42 provides a digitised temperature signal via ADC 70 to Comms Control 66, and thence to processor 36. Control 66 is coupled to a DAC 72, which is clocked by 14 KHz signal from unit 62 to provide drive signals to capacitor plates 22, 24 via sample and hold circuits 74. Processor 36 is connected to an EEPROM memory device 80, which includes sets of look up tables 82, as will be described in more detail. A circulating memory buffer 84 within the processor holds values obtained from look up tables in previous system cycles. These values are supplied to an arithmetic function 86 of the processor. A thresholding function 88 is coupled to arithmetic function 86.

In use, the 14 kHz square wave unit 62 clocks DAC 72 in order to provide drive signals at 14 kHz via respective sample and hold units 74 to capacitor plates 22, 24. The levels of the drive signals are determined by processor 36 and supplied by Comms control 66. The resulting accelerometer output signal as amplified by charge amplifier 28 is digitised at 54 with a 64 kHz sampling signal. This produces 4 ADC samples per cycle of the 14 kHz drive signal. These are at 45 deg, 135 deg, 225 deg, 315 deg. phase within the cycle. A required in-phase demodulation signal is derived by adding the 45 and 135 values, and subtracting the 225 and 315 values. Such in-phase demodulation signal is averaged over four 14 kHz cycles, and the resulting demodulated version of the accelerometer output signal (which enhances capacitance variations arising from movement of said proof mass) is passed via the SPI bus 38 to the processor 36 for computation and compensation at a 3.5 kHz rate. Temperature sensor information is also transmitted on bus 38, and is processed as now described with reference to FIG. 4.

Figure 4:
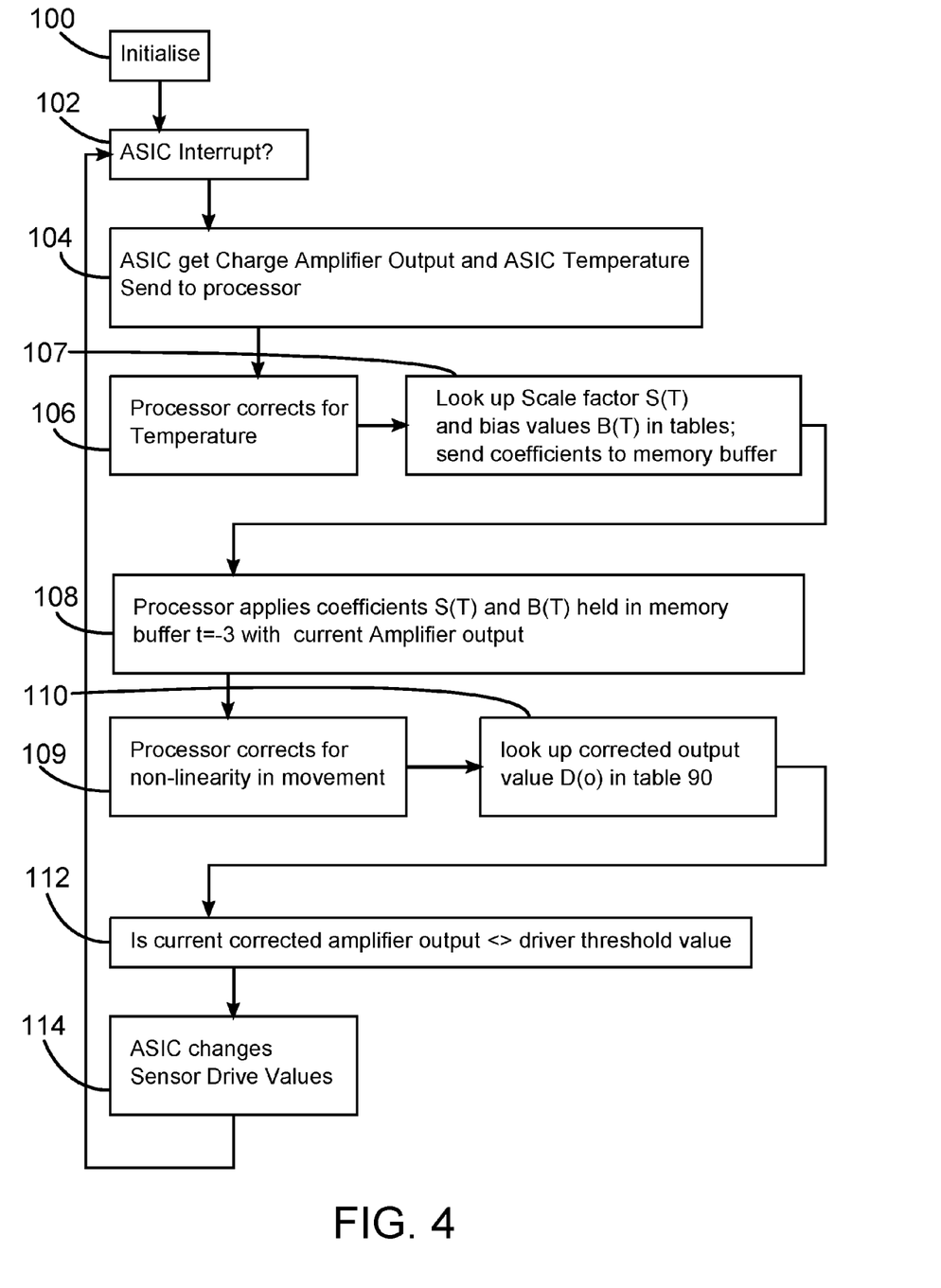
FIG. 4 is a flow chart showing the compensation process for non-linearities arising from mechanical movement and temperature changes, and the updating process for the drive signals, in accordance with the invention.

In FIG. 4, which is a conceptual flow chart of operation of the system, after an initialization operation 100, the process responds to an ASIC interrupt generated by processor 36 at 102. The ASIC 30, via comms unit 66, sends the demodulated accelerometer output version and Temperature information along bus 38 to processor 36 (104). The processor 36 initiates within the 3.5 kHz system cycle, a process for temperature correction at 106. As at 107, Scale factors S and bias Values B are looked up in look up tables 82, different tables being provided for different drive levels. These looked up values are sent to buffer 84 at memory position t=0. Over a number of system cycles, the buffer 84 accumulates a sequence of look up values for consecutive system cycles.

As at 108, in view of the various time delays within the system, and to ensure synchronicity, the processor, by means of arithmetic function 86 multiplies and sums the coefficients held within the buffer at software cycle position t=−3, with the current value of the demodulated accelerometer signal available on bus 38.

The processor at 109 corrects for non-linearity in movement, and in order to do this, as at 110, corrected output values x(=D(o)) are looked up in a separate look up table 90.

The corrected value of the demodulated accelerometer signal is then compared within processor 36, as at 112, with a threshold function 88, in order to ascertain whether the drive signal applied to plates 22, 24 should be increased or decreased in amplitude, or remain at its current level. The thresholding function 88 involves comparing the corrected value with a preset stored value. Two preset values are stored, one high value for increasing output values, for switching to a lower drive level, and another low value for decreasing output values, for switching to a higher drive level, thus giving hysteresis.

Having made a decision the ASIC carries out any necessary changes at 114, and the system then reverts to 102 awaiting the next ASIC interrupt. The corrected demodulated accelerometer output signal is low pass filtered with a cut off at about 100 Hz and output on external data bus 40, together with temperature information.

Thus the system enables an extended operational acceleration range. In order to achieve this, the square wave drive 32, 34, which is applied in anti phase between the two fixed electrodes 22, 24 has its amplitude reduced with increasing g level.

Figure 5:
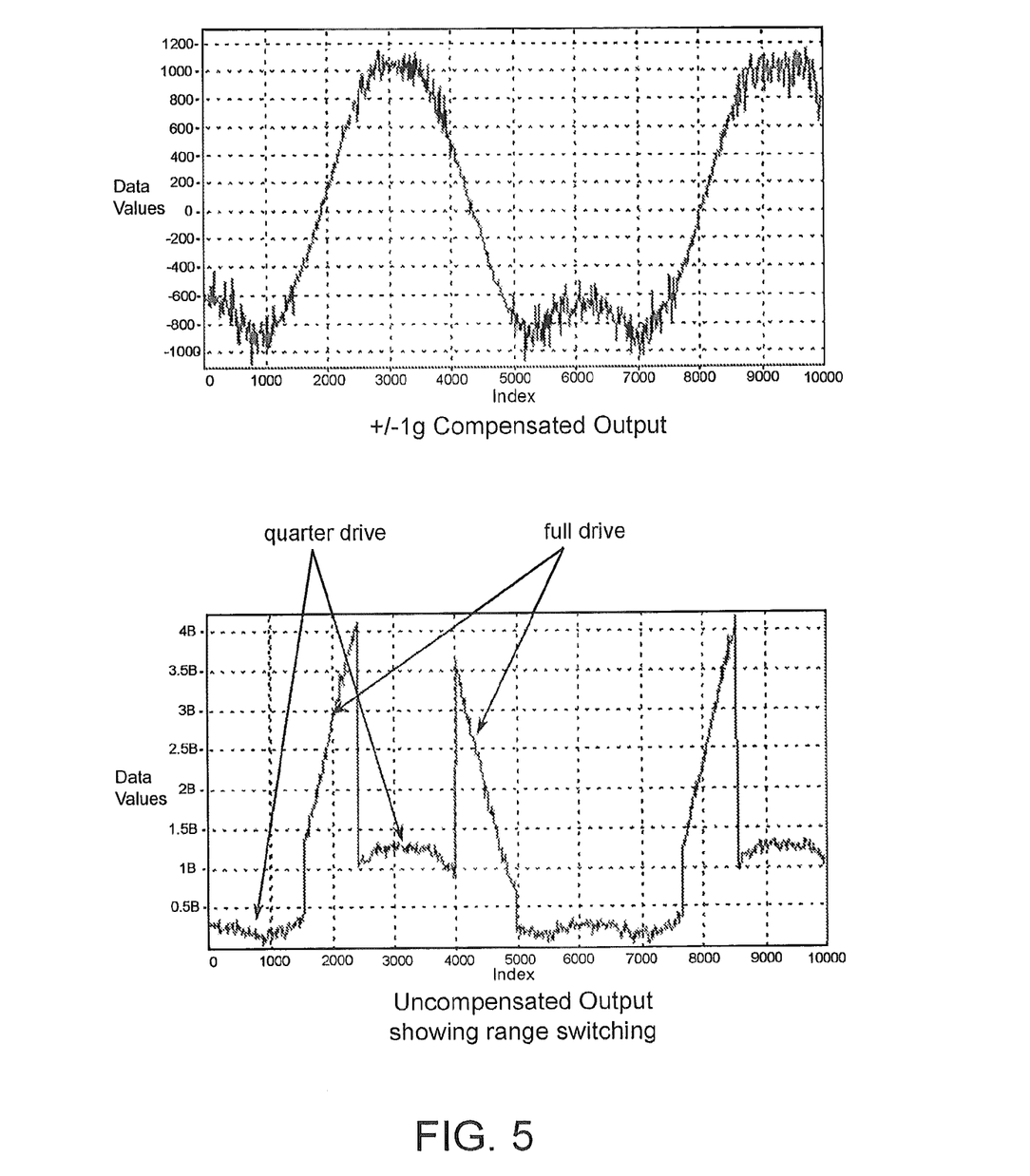
FIG. 5 shows graphs of compensated output and uncompensated output showing range switching for auto ranging, in accordance with the invention.

An example of auto ranging is shown in FIG. 5. In these plots, the accelerometer is tilted to sense 0 deg (+1 g) to 180 deg (−1 g) as a function of time. The auto ranging was set to go from full drive to quarter drive at +/−0.8 g (increasing g) and from quarter drive to full drive at +/−0.2 g (decreasing g). Thus during an indexing cycle one can see the switch from full drive to quarter drive and back again.

The use of auto ranging requires that the drive level needs to be changed in real time, during the operation of the device. This is done at the operational rate of the microprocessor, at 3.5 kHz (¼ of the 14 kHz square wave frequency). Synchronisation is required to ensure that the change is a smooth one. This is due to the delay between setting in software a drive level, and the time when this is achieved as an actual drive level. Having achieved the drive level, there will also be a delay before this new accelerometer output (corresponding to the new drive level) is received in the ASIC, and then transferred to the comms interface from the DAA via an SPI databus with a cycle delay. These delays are in the form of a number of software clock cycles. Typically for the interface operating at 3.5 kHz update rate, there are 3 software cycles to accomplish this. Thus the software has to use the values of 1/scale factor and bias relating to the situation 3 software cycles earlier (typically) when operating on the accelerometer output to do the compensation. This can be accomplished with cyclical buffer 84 for scale factor and bias values as computed from the look up table.

When changing the range (112, 114), there are two limits to exhibit hysteresis. The decision to switch range is made using the compensated output data. Typically for the 30 g accelerometer, the decision to switch down occurs when the input acceleration exceeds +/−7 g, and the decision to switch to higher drive occurs at +/−2 g.

Temperature Compensation Process

Over temperature, the scale factor and bias level exhibit changes, so that the compensation needs to be done over the temperature range to give compensated output in units of real acceleration regardless of the drive level that is being used.

Processor 36 has a memory, which is programmed with scale factor and bias values as a function of temperature for the two drive levels, The first stage of the process is one of calibration. The accelerometer is set up as follows:
a) The drive level is set fixed for two successive runs:
  i) Full drive
  ii) Quarter drive,
This will be tested on an index table (over +/−1 g), and the accelerometer output A(T) as a function of temperature (T) will be produced. This can be fitted to a cubic polynomial as follows:

$$1/SF(T)=a_0+a_1T+a_2T^2+a_3T^3$$

$$bias(T)=b_0+b_1T+b_2T2+b_3T^3,$$

The scale factor SF(T) (in ADC/g) and bias (in g) are determined at each temperature by a linear regression process. Typically 12-16 points (at different equi-spaced angles) will be used to derive the scale factor and bias at any one particular temperature. A set of temperatures to span the range −40 C to 80 C is used, such as: −40, −20, 0, 20, 40, 60, 80. The compensated output o(T) is related to the uncompensated output A(T) above by:

$$o(T)=A(T)/SF(T)-bias(T)$$

$$o(T)=A(T)*(a_0+a_1T+a_2T^2+a_3T^3)-(b_0+b_1T+b_2T2+b_3T^3),$$

The values of a and b determined during calibration can then be used to determine the values to be used in the look up table. In the look up table, the ASIC temperature will be used around the value at 20 C.

Thus:

$$T_1 = T - T_{20}$$

Where $T_{20}$ is the ASIC temperature at 20 C, and T is the ASIC temperature at other temperatures and $T_1$ is the look up temperature used in conjunction with the look up table.

We will have:

$$1/SF(T_1) = A_0 + A_1(S(T_1))$$

$$\text{bias}(T_1) = B_o + B_1(B(T_1)),$$

In this case $A_0$ gives the value of 1/SF at 20 C and $A_1$ is a scaling factor which is multiplied by the value of $S(T_1)$ coming from the look up table. Likewise the value of $B(T_1)$ comes from the bias look up table, and is multiplied by the value of $B_1$ and added to $B_0$ to give bias in g units. These are determined during calibration for full drive and quarter drive.

The process will be as follows:
a) Read ASIC temperature (in real time)
b) Subtract off T20 (in degree C.)
c) Round to nearest 1 C. Determine which element in the array to use (1-120)
d) Look up 1/scale factor and bias values at this temperature
e) Scale values from look up table to actual values for 1/scale factor and bias by one multiply and addition for each
f) Calculate compensated output with one multiply operation (1/sF) and one subtraction (bias)
g) Output compensated acceleration output, In the real time software during use, T will be the temperature determined by the ASIC temperature sensor and the values S(T) and B(T) will be stored within the EEPROM from the calibration.

The look up table will have four arrays as follows:
1) S(T) for full drive
2) S(T) for quarter drive
3) B(T) for full drive
4) B(T) for quarter drive, The software in the processor 36 implements the following function:

$$1/SF(T_1) = A_0 + A_1(S(T_1))$$

$$\text{bias}(T_1) = B_0 + B_1(B(T_1)),$$

Thus in real time software there will need to be a subroutine to extract the relevant values of 1/SF and bias from the look up tables and compute the corresponding values of 1/SF and bias. The elements of the arrays for USF and bias for full and quarter drive will be separately computed from the calibration data and uploaded to the processor 36.

Non-Linearity in Accelerometer Movement

The removal of non-linearity in the accelerometer is done via a polynomial fit to experimental data, derived during a calibration procedure. A third order polynomial will be required, as it is the third order (cubic) non-linearity that is generated as a minimum. Higher order correction may be required for larger g ranges. The calibration approach will use a centrifuge to apply known accelerations up to the maximum of the device. The output of the device can be measured as a function of the input acceleration.

In mathematical terms, the output of the accelerometer o(x) can be written in terms of the input acceleration x as follows:

$$o(x_i) = c_0 + c_1 x_i + c_2 x_i^2 + c_3 x_i^3.$$

There are higher order terms, but using up to the cubic terms will give adequate accuracy for most applications. The calibration measurements will be made for a finite set of readings, i=1 to n.

This can be expressed in a matrix form:

$$O = CX$$

$$X = DO$$

$$D = C^{-1}.$$

Where O is the vector of outputs for the n values, C is a 4*n matrix of fixed coefficients and X is a n*4 matrix of input accelerations during the calibration process (1, x, $x^2$, $x^3$ with n values for each). The values of $c_i$ are determined during the calibration process.

During use, the inverse matrix is used:

$$X = DO,$$

The values of d are determined from the calibration values. We can thus form a set of coefficients d as below:

$$x = d_0 + d_1 o + d_2 o^2 + d_3 o^3,$$

The parameters d, are determined by a similar matrix inversion as above.

In order to be effective against vibration, the non-linearity correction needs to be applied in real time software, at a rate higher than the vibration input. Thus if typically vibrational inputs up to 1.5 kHz are considered, so the software cycle which corrects the non-linearity may need to be at 3 kHz or above. More generally, vibrational rates up to between 1 kHz and 2 kHz may be excluded, requiring system cycle rates of at least between 2 and 4 kHz. As a simple polynomial correction with three multiplications is required, this can easily be achieved with low cost modern microprocessors. The quadratic non-linearity is a key one in regard to vibration rectification error. A quadratic non-linearity gives a steady acceleration in response to an alternating input, hence this needs to be accurately corrected.

With such real time polynomial correction in place, it will be possible to have a maximum g range in excess of the usually used 10% of the gap. It is usual to have bump stops to limit the motion to prevent the moveable proof mass 26 hitting the fixed capacitor plates 22, 24. This is important to do as the charge amp is commonly attached to the moveable proof mass and may be damaged by contact to the drive voltages on the fixed plates. With real time non-linearity correction in place therefore the maximum limit of the accelerometer displacement will be set by bump stops, which will permit a greater range of movement that heretofore, and hence a greater maximum g range for a device of a given resonant frequency, by real time non-linearity correction. In a practical version the maximum measured g may be increased to 30 g, as opposed to 7 g without the aforesaid correction procedure.

The change in drive level can either be continuous, with the scale factor being adjusted in proportion to the reduced drive level or as described in discrete steps. In a further embodiment, where a microprocessor with greater processing power is available, changes in drive level are performed on a continuous basis.

In this further embodiment employing a continuous change in drive level, the large hysteresis factor, which is built into the thresholding operation for the first embodiment, is replaced by a low-pass filtering function applied to the demodulated accelerometer output, since changes in applied g level may take place slowly relative to disturbances and perturbations such as vibration (~kHz). The demodulated and temperature corrected version of the accelerometer output signal is subject to a low pass filter having a cut off frequency of about 1 Hz or less, and this low pass filtered signal is employed as a basis for adjusting the drive level. Thus the drive level may be adjusted with a frequency of about 1 Hz or less. Since the drive level affects the value of temperature correction, in particular scale factor correction, a further correction may be introduced. That is the scale factor value, accessed from a single look up table may be multiplied, in a further arithmetic operation by a factor proportional to the inverse of the current drive level, in order to drive a temperature compensated version of the accelerometer output signal. Optionally the Bias value may be similarly corrected with such further arithmetic operation.

Thus in summary, the upper limit on the acceleration range for any particular drive is set by two things:

a) saturation of the charge amplifier, as in open loop the output signal is proportional to the input acceleration b) a maximum displacement in proportion to the gap between the two fixed plates.

As the MEMS structure is essentially a differential capacitor with two fixed plates and one moveable plate (which moves under acceleration), when using an equal anti phase drive on the two fixed plates, the output is a signal proportional to the input acceleration given by the change in differential capacitance. As the moveable plate moves there is an increasing non-linearity in the differential capacitance. Thus the maximum tolerable movement (as a proportion of the gap) that can be used depends on the degree of non-linearity that can be tolerated. However this non-linearity (which is cubic) is deterministic, so can be compensated within the device if there is sufficient computational power to do this.

The maximum acceleration that the MEMS can be used depends on the fraction of the gap that the moveable plates moves to. This is set by the resonance frequency of the MEMS (i.e. the spring stiffness in relation to the mass). This gives rise to non-linearity of the sensor due to non-linearity of the differential capacitor transducer. However real time non-linearity compensation can overcome this non-linearity, at the expense of a calibration process.

The other factor is that the noise of the accelerometer needs to be as low as possible which can be achieved with as high a drive level as possible. The noise is especially important at low applied g levels, hence the drive needs to be as high as possible in this region. In a practical example, a DAC can generate 2.5V maximum square waves (at typically 14 kHz), so this sets the limits of noise that can be achieved. The noise has two components principally:

a) the shot noise on the JFET pre amplifier.

b) there is some LSB noise on the ADC after the pre amplifier,

Thus in the practical example the noise is limited by the specifics of the DAA ASIC. Reducing the drive by a factor of 4 increases the noise by a factor of 4 at the high acceleration levels when quarter drive is applied, or in proportion if the drive level is changed smoothly with increased g levels.

Some schemes have unequal anti phase drives but equal anti phase drive at zero g. As the moveable plate moves towards one plate, the amplitude of this is reduced in proportion to the movement and the capacitor with the bigger gap has the amplitude increased by the same amount as the reduction on the other plate. This process reduces the non-linearity so that a higher proportion of the gap can be used before the non-linearity appears. In this scheme the amplitudes of both can be reduced in proportion to the applied g, with the scale factor and bias changed at the same time. Thus the auto ranging scheme can be used with this scheme to give a higher g level, and a higher proportion of the gap without significant non-linearity.

What is claimed is:

1. An accelerometer open loop control system comprising a variable capacitance accelerometer comprising a proof mass movable between first and second capacitor plates, drive means for applying drive signals to said capacitor plates, amplifier means for amplifying an accelerometer output signal representing applied acceleration, and monitoring means for monitoring said output signal, and for adjusting said drive signals in dependence on the output signal in order to restrict the amplitude of said accelerometer output signal.

2. A control system according to claim 1, wherein the monitoring means is arranged to provide said drive signals with a plurality of possible amplitude values, in dependence on said accelerometer output signal.

3. A control system according to claim 1, wherein said monitoring means includes thresholding means for comparison of a version of said output signal with one or more thresholding values, and for adjusting said drive signals in dependence on the comparison.

4. A control system according to claim 3, wherein said thresholding means includes a first high thresholding value for increasing values of said output signal, for reducing said drive signals and a second low thresholding value for decreasing values of said output signal for increasing said drive signals.

5. A control system according to claim 1, wherein the monitoring means is arranged to provide said drive signals with a continuously variable amplitude value, in dependence on said accelerometer output signal.

6. A control system according to claim 5, including low-pass filtering means for filtering a version of said output signal, and means for adjusting the drive signals in dependence on the low-pass filtered version of said output signal.

7. A control system according to claim 1, and including means for applying a correction to said accelerometer to compensate for inaccuracies arising from changes in temperature of said accelerometer.

8. A control system according to claim 7, wherein the compensations are based on a polynomial expression, preferably a third order polynomial expression.

9. A control system according to claim 7, wherein the monitoring means is arranged to adjust said drive signals in dependence on compensated values of a version of said accelerometer output signal.

10. A control system according to claim 7, including processor means arranged to access a memory containing one or more look-up tables containing compensation values for said inaccuracies.

11. A control system according to claim 10, including a look-up table containing compensation values for non-linearities arising from mechanical movement of said proof mass.

12. A control system according to claim 10, wherein the compensations are based on a polynomial expression, preferably a third order polynomial expression.

13. A control system according to claim 10, including a first look-up table for holding compensating values for a scale factor to be applied to a version of said accelerometer output signal as a function of temperature, and a second look-up table for holding bias values to be applied to a version of said accelerometer output signal as a function of temperature, representing movement of said proof mass from a null position.

14. A control system according to claim 13, wherein said drive signals have a plurality of possible amplitude values, and respective said first and second look-up tables being provided for each amplitude value.

15. A control system according to claim 1, and including means for applying a correction to compensate for inaccuracies arising from non-linearities in mechanical movement of said proof mass.

16. A control system according to claim 15, wherein the compensations are based on a polynomial expression, preferably a third order polynomial expression.

17. A control system according to claim 15, wherein the monitoring means is arranged to adjust said drive signals in dependence on compensated values of a version of said accelerometer output signal.

18. A control system according to claim 15, including processor means arranged to access a memory containing one or more look-up tables containing compensation values for said inaccuracies.

19. A control system according to claim 18, including a look-up table containing compensation values for non-linearities arising from mechanical movement of said proof mass.

20. A control system according to claim 18, including memory buffer means for holding compensation values accessed in a plurality of system cycles, and processor means being arranged to carry out an arithmetic compensation operation on a current value of a version of said accelerometer output signal with compensation values accessed in a previous system cycle, in order to correct for delays within the control system.

21. A control system according to claim 18, wherein the compensations are based on a polynomial expression, preferably a third order polynomial expression.

22. A control system according to claim 18, wherein the monitoring means is arranged to adjust said drive signals in dependence on compensated values of a version of said accelerometer output signal.

23. A control system according to claim 18, including a first look-up table for holding compensating values for a scale factor to be applied to a version of said accelerometer output signal as a function of temperature, and a second look-up table for holding bias values to be applied to a version of said accelerometer output signal as a function of temperature, representing movement of said proof mass from a null position.

24. A control system according to claim 23, wherein said drive signals have a plurality of possible amplitude values, and respective said first and second look-up tables being provided for each amplitude value.

* * * * *